United States Patent
Xuan et al.

(10) Patent No.: US 11,782,609 B2
(45) Date of Patent: Oct. 10, 2023

(54) METHOD AND APPARATUS FOR AUDITING ABNORMALITY OF BLOCK DEVICE IN CLOUD PLATFORM, DEVICE, AND STORAGE MEDIUM

(71) Applicant: INSPUR SUZHOU INTELLIGENT TECHNOLOGY CO., LTD., Jiangsu (CN)

(72) Inventors: Yandong Xuan, Jiangsu (CN); Kaiyuan Qi, Jiangsu (CN); Bao Ma, Jiangsu (CN); Dong Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/004,598

(22) PCT Filed: Feb. 24, 2021

(86) PCT No.: PCT/CN2021/077591
§ 371 (c)(1),
(2) Date: Jan. 6, 2023

(87) PCT Pub. No.: WO2022/007418
PCT Pub. Date: Jan. 13, 2022

(65) Prior Publication Data
US 2023/0195325 A1 Jun. 22, 2023

(30) Foreign Application Priority Data
Jul. 8, 2020 (CN) .......................... 202010661550.3

(51) Int. Cl.
*G06F 3/06* (2006.01)

(52) U.S. Cl.
CPC ............ *G06F 3/0619* (2013.01); *G06F 3/067* (2013.01); *G06F 3/0635* (2013.01)

(58) Field of Classification Search
CPC ....... G06F 3/0619; G06F 3/067; G06F 3/0635
See application file for complete search history.

(56) References Cited

U.S. PATENT DOCUMENTS

| 11,258,688 B2* | 2/2022 | Gell ..................... H04L 67/1095 |
| 2009/0165016 A1* | 6/2009 | Bell, Jr. ................ G06F 9/5066 |
| | | 718/107 |

(Continued)

FOREIGN PATENT DOCUMENTS

| CN | 1633131 A | 6/2005 |
| CN | 103023723 A | 4/2013 |

(Continued)

OTHER PUBLICATIONS

International search report for PCT/CN2021/077591 dated May 17, 2021.
Chinese search report for application No. 202010661550.3, dated Aug. 10, 2022.

*Primary Examiner* — Mark A Giardino, Jr.
(74) *Attorney, Agent, or Firm* — Dennemeyer & Associates LLC; Victoria Friedman

(57) ABSTRACT

Provided is a method for auditing an abnormality of a block device in a cloud platform. By automatically auditing abnormal data of a path layer and a multipath layer, the accuracy of multipath and path information on a host and whether a link has a fault may be quickly analyzed, operation and maintenance personnel may discover problems as soon as possible, the problem troubleshooting steps are simplified, the operation and maintenance personnel are liberated from complex work of manual troubleshooting, the troubleshooting capability of a cloud computing platform is improved, (Continued)

the work of the operation and maintenance personnel is simplified, and the problems are rapidly positioned.

17 Claims, 5 Drawing Sheets

(56) References Cited

U.S. PATENT DOCUMENTS

| | | | |
|---|---|---|---|
| 2014/0215077 A1* | 7/2014 | Soudan | H04L 47/11 709/226 |
| 2018/0088809 A1* | 3/2018 | Liu | G06F 3/0689 |
| 2018/0131562 A1* | 5/2018 | Domrow | H04L 41/0663 |
| 2020/0204448 A1* | 6/2020 | Nataraj | H04L 41/046 |

FOREIGN PATENT DOCUMENTS

| | | |
|---|---|---|
| CN | 103150127 A | 6/2013 |
| CN | 103795753 A | 5/2014 |
| CN | 105162824 A | 12/2015 |
| CN | 105630715 A | 6/2016 |
| CN | 105760261 A | 7/2016 |
| CN | 106060013 A | 10/2016 |
| CN | 106210121 A | 12/2016 |
| CN | 107451014 A | 12/2017 |
| CN | 109120522 A | 1/2019 |
| CN | 109359484 A | 2/2019 |
| CN | 111901399 A | 11/2020 |

* cited by examiner

METHOD AND APPARATUS FOR AUDITING ABNORMALITY OF BLOCK DEVICE IN CLOUD PLATFORM, DEVICE, AND STORAGE MEDIUM

CROSS-REFERENCE TO RELATED APPLICATIONS

This is a 35 U.S.C. 371 National Stage Patent Application of International Application No. PCT/CN2021/077591, filed Feb. 24, 2021, which claims priority to Chinese application 202010661550.3, filed Jul. 8, 2020, each of which is hereby incorporated by reference in its entirety.

TECHNICAL FIELD

The present disclosure relates to the technical field of communications, and in particular to a method and apparatus for auditing an abnormality of a block device in a cloud platform, a device, and a readable storage medium.

BACKGROUND

Most of magnetic disks used in virtual machines running on a distributed cloud platform based on a Storage Area Network (SAN) storage are provided by an external storage linked through a Small Computer System Interface (SCSI) link, the SCSI being a data link protocol and referring to Fiber Channel (FC) and an Internet Small Computer System Interface (ISCSI) protocols on which the SAN storage depends in the present disclosure. There are many levels involved, including a management level, a physical link layer, a storage level, etc. of a block device (referring to an SCSI block device taken over through the SAN in the present disclosure) of an operating system of a host (referring to a physical node of the virtual machine running on the cloud platform in the present disclosure) where the virtual machine is located.

Under a multi-level block device management mechanism, the management of the magnetic disk (including magnetic disk creation, linking, capacity expansion, deletion, etc.) may be problematic at each level, and after the problem occurs, data and flags may remain at each level, which may affect the subsequent magnetic disk creation, mount, and other operations to a large extent. For example, if the data and flags remain in a storage layer, a waste of storage resources may be caused. If flag bits remain on a host side, the data will not be updated due to flat bit conflicts. However, since the above problems involve many levels and a wide range of knowledge, and the data volume at each level is large, under normal circumstances, operation and maintenance personnel are difficult to determine the problem in advance, and often handle the problem urgently after an impact on the service. Furthermore, the difficulty in problem positioning is relatively high and personnel with professional knowledge is often required to handle, which may waste the golden period of problem handling and have a greater impact on the service.

Therefore, how to improve the detection speed and positioning accuracy of cloud platform block device exceptions to ensure the stability of system operation is an urgent problem to be solved by those skilled in the art.

SUMMARY

An object of embodiments of the present disclosure is to provide a method for auditing an abnormality of a block device in a cloud platform, which may simplify command logic and process execution, and ensure the rapid and stable operation of a storage device. Another object of embodiments of the present disclosure is to provide an apparatus for auditing an abnormality of a block device in a cloud platform, a device, and a readable storage medium.

In order to solve the above technical problem, an embodiment of the present disclosure provides a method for auditing an abnormality of a block device in a cloud platform, which may include the following operations.

A multipath-id set is acquired when a host node in the cloud platform executes a multipath module service.

Magnetic disk device path information and multipath information of each multipath in the set are determined as to-be-audited device information.

Information status of each information item in the to-be-audited device information is identified, and to-be-audited status filling is performed according to the information status to obtain audit status.

The audit status corresponding to each multipath is stored.

In an embodiment, the operation of identifying information status of each information item in the to-be-audited device information, and performing to-be-audited status filling according to the information status to obtain audit status may include the following operations.

Information status of the multipath information in the to-be-audited device information is identified, and multipath level status filling is performed according to the information status of the multipath information to obtain multipath level status.

Information status of the magnetic disk device path information in the to-be-audited device information is identified, and path level status filling is performed according to the information status of the path information to obtain path level status.

The multipath level status and the path level status are used as the audit status.

In an embodiment, the multipath information may include: a multipath unique identity, multipath device size, a sub-path device, a sub-path, a sub-path unique identity and a sub-path lun-id. The operation of identifying information status of the multipath information in the to-be-audited device information, and performing multipath level status filling according to the information status of the multipath information to obtain multipath level status may include the following operations.

Whether the number of the sub-paths is 0 is determined, and if so, the filling status is LEGACY_PATH.

Whether the multipath unique identity is consistent with the sub-path unique identity is determined, and if not, the filling status is WWN_NOT_EQUAL.

Whether each sub-path is smooth, and if not, the filling status is PATH_FAILED.

In an embodiment, the magnetic disk device path information may include: a device, a unique identity, a path and a lun-id. Then according, the operation of identifying information status of the magnetic disk device path information in the to-be-audited device information, and performing path level status filling according to the information status of the path information to obtain path level status may include the following operations.

Whether the unique identity may be normally acquired is determined, and if not, same is marked as WWN_ERROR.

Whether each path is aggregated by the multipath is determined, and the unaggregated path is marked as NOT_IN_MPATH.

In an embodiment, the operation of determining whether each path is aggregated by the multipath, and marking the unaggregated path as NOT_IN_MPATH may include the following operation.

Whether each path is aggregated by the multipath is determined by using a binary search, and the unaggregated path is marked as NOT_IN_MPATH.

In an embodiment, after acquiring the multipath-id set, the method may further include the following operations.

Whether the number of the multipaths in the set reaches a single thread processing threshold is determined.

If so, the multipath-id set is split into a plurality of sub-sets.

Then accordingly, the operation of determining magnetic disk device path information and multipath information of each multipath in the set as to-be-audited device information may include that: the magnetic disk device path information and the multipath information of each multipath in each subset are respectively determined by calling multithreading.

In an embodiment, the operation of determining magnetic disk device path information and multipath information of each multipath in the set as to-be-audited device information may include the following operations.

The magnetic disk device path information and the multipath information of each multipath in the set are acquired.

Object data is generated according to the acquired information, and magnetic disk device path object data and multipath object data are obtained.

The magnetic disk device path object data and the multipath object data are used as the to-be-audited device information.

An embodiment of the present disclosure further provides an apparatus for auditing an abnormality of a block device in a cloud platform, which is applied to a host node in the cloud platform and may include: a set acquisition unit, an information determination unit, a status audit unit, and a status storage unit.

The set acquisition unit may be configured to acquire a multipath-id set when a multipath module service is executed.

The information determination unit may be configured to determine magnetic disk device path information and multipath information of each multipath in the set as to-be-audited device information.

The status audit unit may be configured to identify information status of each information item in the to-be-audited device information, and perform to-be-audited status filling according to the information status to obtain audit status.

The status storage unit may be configured to store the audit status corresponding to each multipath.

An embodiment of the present disclosure further provides a computer device, which may include: a memory and a processor.

The memory may be configured to store a computer program.

The processor may be configured to implement the steps of the method for auditing an abnormality of a block device in a cloud platform when executing the computer program.

An embodiment of the present disclosure further provides a readable storage medium, on which a program is stored, and when executed by a processor, the program implements the steps of the method for auditing an abnormality of a block device in a cloud platform.

According to the method for auditing an abnormality of a block device in a cloud platform provided by an embodiment of the present disclosure, by automatically auditing abnormal data of a path layer and a multipath layer, the accuracy of multipath and path information on a host and whether a link has a fault may be quickly analyzed, operation and maintenance personnel may discover problems as soon as possible, the problem troubleshooting steps are simplified, the operation and maintenance personnel are liberated from complex work of manual troubleshooting, the troubleshooting capability of a cloud computing platform is improved, the work of the operation and maintenance personnel is simplified, and the problems are rapidly positioned; meanwhile, real-time monitoring is realized in the multipath service operation process, the operation and maintenance personnel may be informed in time of handling in advance once an exception occurs in the operation process, the influence on service data is prevented, and therefore the stability of a cloud platform service system is further improved.

An embodiment of the present disclosure further provides an apparatus for auditing an abnormality of a block device in a cloud platform, a device, and a readable storage medium, which have the above beneficial effects and will not be elaborated herein.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

Figure 1:
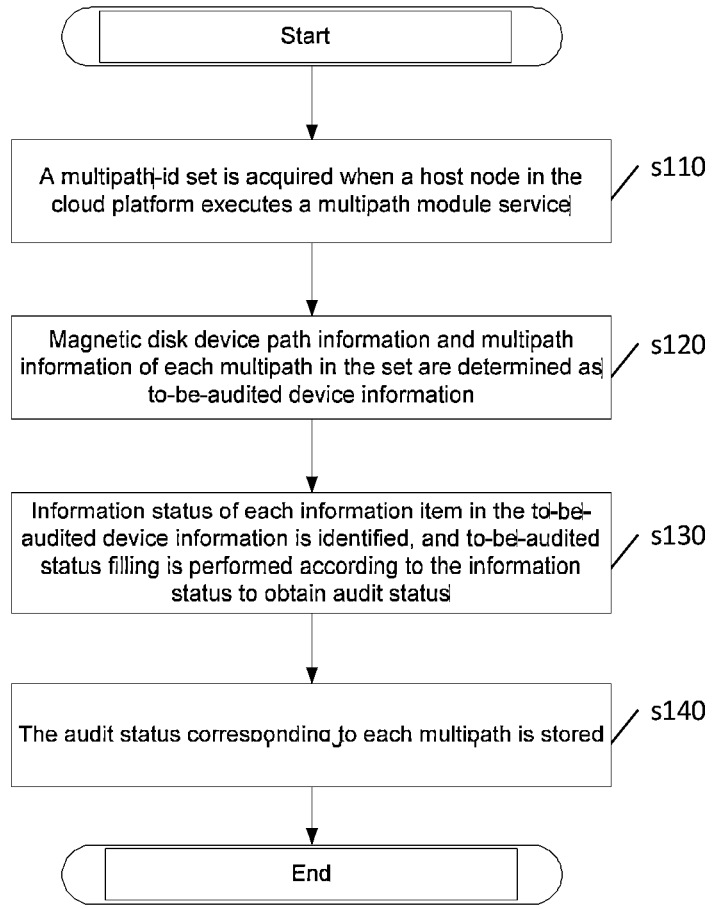
FIG. 1 is a flowchart of a method for auditing an abnormality of a block device in a cloud platform provided by an embodiment of the present disclosure.

The main purpose of the present disclosure is to provide a method for auditing an abnormality of a block device in a cloud platform, which may simplify command logic and process execution, and ensure the rapid and stable operation of a storage device. Another purpose of the present disclosure is to provide an apparatus for auditing an abnormality of a block device in a cloud platform, a device, and a readable storage medium.

In order to make the objects, technical solutions and advantages of the embodiments of the present disclosure clearer, the technical solutions in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those of ordinary skill in the art based on the embodiments of the present disclosure without creative efforts are within the scope of protection of the present disclosure.

An embodiment of the present disclosure provides a method for auditing an abnormality of a block device in a cloud platform, which is based on an SAN storage and is applied in a distributed cloud platform scenario.

Under a cloud computing architecture platform, a block storage topology based on an SAN architecture is a more important aspect, the block storage provides high-speed and disaster-tolerant data storage for the cloud platform, so when the topology structure is increased, the difficulty of implementing a technology stack and the error points a point where the problem occurs (physical link failure, etc.) are also increased.

In the actual service process, after path device information is sourced from the mount of a storage volume, the operating system discovers the volume through a command (FC, or ISCSI related command), and the multipath information source is aggregated according to the path information. The data generation at three levels (storage mapping, path and multipath) has a dependency relationship, and the generation and cleaning must be consistent to prevent the data residue at different levels affecting the subsequent service. However, due to the program exceptions or human processing omissions, data residues will occur at three levels, thereby resulting in subsequent data exceptions.

Based on this, the embodiment of the present disclosure performs auditing on the basis of the SAN storage, and a storage disk whose (FC and ISCSI) protocols are mapped to a host, so that the accuracy of the multipath and path information on the host and whether a link has a fault may be quickly analyzed, exception audit for a host side may be realized when using the SAN storage linked through an SCSI link, the troubleshooting capability of the cloud computing platform may be improved, and the work of operation and maintenance personnel may be simplified.

It is to be noted that the audit method provided by the embodiment follows the knowledge of a linux (an operating system) operating system, depends on the fact that the operating system of the cloud platform host needs to be of linux type, and needs the permission to view the multipath command and the magnetic disk device status.

Referring to FIG. 1, FIG. 1 is a flowchart of a method for auditing an abnormality of a block device in a cloud platform provided by an embodiment, and the method mainly includes the following operations.

At s110, a multipath-id (multipath module identity) set is acquired when a host node in the cloud platform executes a multipath module service.

In the exception audit method provided by the embodiment, a subsequent exception audit process is started when the multipath service is executed, and in order to determine whether the host node in the cloud platform executes the multipath module service, before acquiring the multipath-id set, whether the multipath service is started may be further determined, if not, a subsequent multipath audit process is not started, and if so, the step of acquiring the multipath-id set and subsequent steps are executed. In the embodiment, the above triggering condition is merely described as an example, other methods of triggering acquisition of the multipath-id set will not be elaborated herein, and all may refer to the description of the embodiment.

After starting the exception audit, the multipath-id set needs to be acquired first, there may be a plurality of running multipaths in a cloud platform block device, and each multipath needs to be audited to determine whether an exception occurs, so that the multipath-id set needs to be determined, and each multipath is audited according to an id (identity).

At s120, magnetic disk device path information and multipath information of each multipath in the set are determined as to-be-audited device information.

In a multipath service scenario, two levels of information mainly need to be collected in the embodiment: the magnetic disk device path information and the multipath (multipath module) information. The magnetic disk device path information mainly includes: a magnetic disk device (device), a magnetic disk unique identity (the unique identity is a World Wide Name (WWN)), a magnetic disk path (path) and a lun-id (logical unit id); and the multipath information mainly includes: a multipath unique identity, multipath device size (size), status, a sub-path (Sub_path), a sub-path unique identity, and a sub-path lun-id. No limitations are made to the specific information items for the acquisition of the magnetic disc device path information and the multipath information in the embodiment, and the configuration of the information items may be performed according to actual audit requirements, which will not be elaborated herein.

Figure 2:
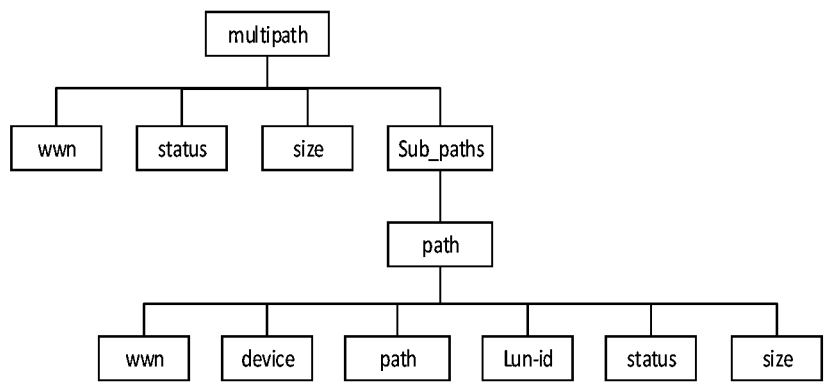
FIG. 2 is a schematic diagram of a hierarchical structure between magnetic disk device path information and multipath information provided by an embodiment of the present disclosure.

Herein, the sub-path information source in the multipath is device path information, a schematic diagram of a hierarchical structure between magnetic disk device path information and multipath (multipath module) information is shown in FIG. 2, and information query and acquisition may be performed according to the diagram.

It is to be noted that the acquired path information and multipath information may be directly used as the to-be-audited device information to perform a subsequent information status query, and in order to further improve the information retrieval efficiency, in an embodiment, the process of determining magnetic disk device path information and multipath information of each multipath in the set as to-be-audited device information may include the following steps.

(1) The magnetic disk device path information and the multipath information of each multipath in the set are acquired.

(2) Object data is generated according to the acquired information, and magnetic disk device path object data and multipath object data are obtained.

(3) The magnetic disk device path object data and the multipath object data are used as the to-be-audited device information.

In the audit process, the multipath information and the path information are converted into objects, and when the multipath information and the path information are converted into the object data, fault status has been generated according to the data itself and may be directly acquired, so that the data format of the to-be-audited device information is unified, the data is standardized, the program structure may also be further simplified, the status judgement logic is simplified by using object orientation, and the execution efficiency of the data audit may be improved.

At s130, information status of each information item in the to-be-audited device information is identified, and to-be-audited status filling is performed according to the information status to obtain audit status.

The to-be-audited device information is parsed, and the information status of each information item is determined according to the details of the multipath information and the path information, for example, whether there is a residual path is determined according to the number of the sub-paths, etc. No limitations are made to the status item of a specific audit and the corresponding audit method in the embodiment, and corresponding settings may be made according to the actual device exception type, which will not be elaborated in the embodiment.

At s140, the audit status corresponding to each multipath is stored.

The audit status is stored, specifically, the audit status corresponding to each multipath may be stored in a file named by the audit time, which may prevent overwriting, of course, the audit status may also be stored in other methods, and no limitations are made thereto.

After the audit status is stored, it is convenient for the operation and maintenance personnel to check periodic results at irregular intervals to view whether there is an exception.

Based on the above description, in the method for auditing an abnormality of a block device in a cloud platform provided by the embodiment, by automatically auditing abnormal data of a path layer and a multipath layer, the accuracy of multipath and path information on a host and whether a link has a fault may be quickly analyzed, the operation and maintenance personnel may discover problems as soon as possible, the problem troubleshooting steps are simplified, the operation and maintenance personnel are liberated from complex work of manual troubleshooting, the troubleshooting capability of the cloud computing platform is improved, the work of the operation and maintenance personnel is simplified, and the problems are rapidly positioned; meanwhile, real-time monitoring is realized in the multipath service operation process, the operation and maintenance personnel may be informed in time of handling in advance once an exception occurs in the operation process, the influence on service data is prevented, and therefore the stability of a cloud platform service system is further improved.

No limitations are made to audit items and specific audit methods in the above embodiment, the embodiment mainly describes an audit method, and other implementation methods based on the embodiment are all within the scope of protection of the present disclosure.

In an embodiment, the operation of identifying information status of each information item in the to-be-audited device information, and performing to-be-audited status filling according to the information status to obtain audit status may include the following three steps.

(1) Information status of the multipath information in the to-be-audited device information is identified, and multipath level status filling is performed according to the information status of the multipath information to obtain multipath level status.

(2) Information status of the magnetic disk device path information in the to-be-audited device information is identified, and path level status filling is performed according to the information status of the path information to obtain path level status.

(3) The multipath level status and the path level status are used as the audit status.

Status audit is performed on the information status of the magnetic disk device path information and the information status of the multipath information respectively, so as to generate the multipath level status and the path level status as the audit status, which may help the operation and maintenance personnel to distinguish and output the exceptional conditions of the path level and the multipath level, and may more clearly display the location of the problem, so as to improve the operation and maintenance efficiency.

Herein, the multipath information may specifically include the following information items: a multipath unique identity (namely, a WWN), multipath device size, a sub-path device, a sub-path, a sub-path unique identity and a sub-path lun-id. Accordingly, the process of identifying information status of the multipath information in the to-be-audited device information, and performing multipath level status filling according to the information status of the multipath information to obtain multipath level status in the above step (1) may be specifically executed according to the following steps.

(1.1) Whether the number of the sub-paths is 0 is determined, and if so, the filling status is LEGACY_PATH (residual path).

Too many residual paths may affect the execution efficiency of the multipath and need to be cleaned.

(1.2) Whether the multipath unique identity is consistent with the sub-path unique identity is determined, and if not, the filling status is WWN_NOT_EQUAL (the unique identities are inconsistent).

The multipath unique identity must normally be consistent with the sub-path unique identity, otherwise the normal use of the magnetic disk will be affected.

(1.3) Whether each sub-path is smooth is determined, and if not, the filling status is PATH_FAILED (the path is failed).

The path is failed, namely, the link status is failed, and when some paths are failed, the use of the magnetic disk is not affected temporarily, but the problem needs to be solved in time, otherwise the performance of the magnetic disk will be degraded, and if all paths are failed, the magnetic disk will not be used to affect the service.

The above audit process may ensure the effective troubleshooting of multipath exceptional status and relieve the problem positioning pressure of the operation and maintenance personnel.

Herein, the magnetic disk device path information may specifically include: a device, a unique identity, a path and a lun-id. Then accordingly, the process of identifying information status of the magnetic disk device path information in the to-be-audited device information, and performing path level status filling according to the information status of the path information to obtain path level status in the above step (2) may be specifically executed according to the following steps.

(2.1) Whether the unique identity may be normally acquired is determined, and if not, same is marked as WWN_ERROR (the unique identity is erroneous).

(2.2) Whether each path is aggregated by the multipath is determined, and the unaggregated path is marked as NOT_IN_MPATH (unaggregated by the multipath).

In the path information, when determining the NOT_IN_MPATH status, whether the WWN of the path is in a multipath_ids list is compared according to the acquired multipath_ids list, and if so, it indicates that the path is aggregated by the multipath. When the path is unaggregated by the multipath, the performance of the magnetic disk and disaster tolerance may be affected.

When the multipath_ids is too large, the performance of the search may be degraded by using a common traversal search. In an embodiment, whether each path is aggregated by the multipath may be determined by using a binary search, and the unaggregated path is marked as NOT_IN_M-PATH. By constantly performing half-and-half splitting on the ordered data set through the binary search and checking a middle element of each partition, the query speed may be increased to further improve the audit efficiency.

Figure 3:
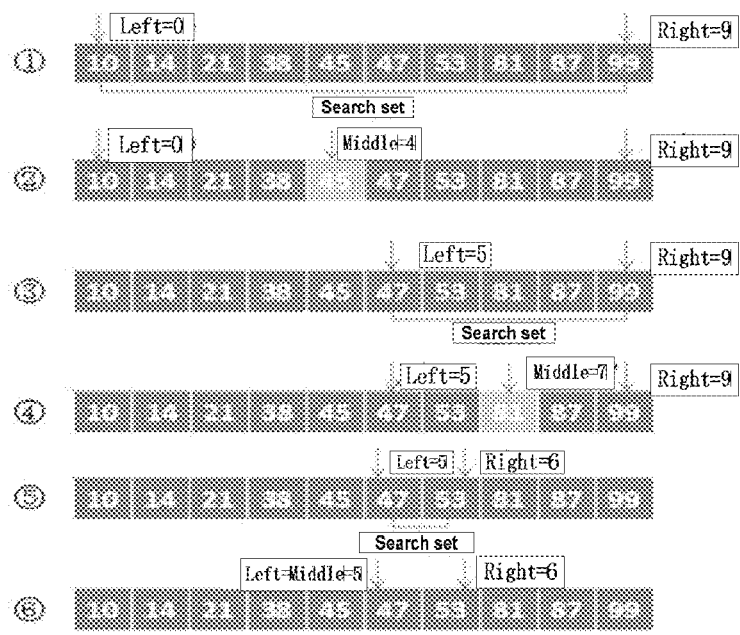
FIG. 3 is a schematic diagram of a binary search provided by an embodiment of the present disclosure.

Specifically, the implementation process of the binary search is as follows, and FIG. 3 shows a schematic diagram of a binary search.

First, left and right are set to 0 and size-1 respectively. During each iteration of the loop, middle (namely, a middle position) is set to a middle value of an area between left and right.

If the element at middle is smaller than a target value, a left index value is moved to the position of one element after middle. That is, the next set of to-be-searched areas is the upper half of the current data set.

If the element at middle is greater than the target element, a right index value is moved to the position of the element before middle. That is, the next set of to-be-searched areas is the lower half of the current data set.

As the search continues, left moves from left to right and right moves from right to left. Once the target is found at middle, the search will stop. If no target is found, left and right will coincide.

Based on the above embodiment, when there are too many multipath-ids lists, the multipath detailed information is queried sequentially and parsed, then the consumed time is linearly increased according to the length of the list, and in order to improve the execution speed, in an embodiment, after acquiring the multipath-id set, whether the number of the multipaths in the set reaches a single thread processing threshold may be further determined; if so, the multipath-id set is split into a plurality of sub-sets. Then accordingly, the operation of determining magnetic disk device path information and multipath information of each multipath in the set includes that: the magnetic disk device path information and the multipath information of each multipath in each subset are respectively determined by calling multithreading.

When the multipath details are queried and parsed, concurrent query and parsing is performed by using a multithreading technology. According to the length of the list, if the length is greater than a preset single thread processing threshold (such as 10), the list is split into groups of 10, one group corresponds to one thread for information query and parsing, multithreading concurrent query and parsing may be performed, and finally the results are summarized into a total list, which may improve the audit speed through multithreading.

In order to deepen the understanding of the steps of auditing an abnormality of a block device in a cloud platform provided in the above embodiment, a specific implementation mode is used as an example to describe the overall implementation flow in the embodiment, and other implementation processes based on the above embodiment may all refer to the description of the embodiment, which will not be elaborated herein.

Figure 4:
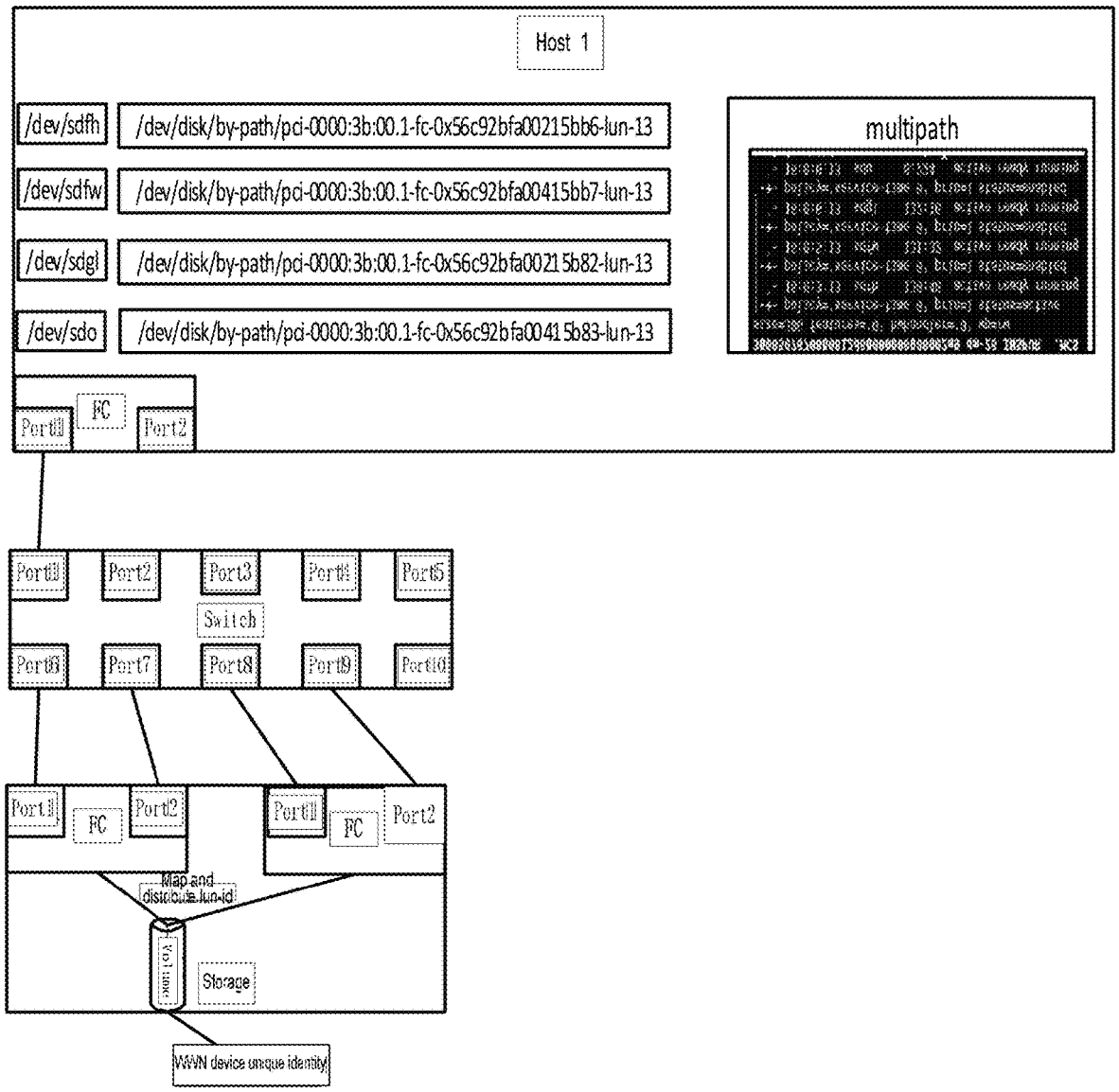
FIG. 4 is a schematic diagram of a storage mapping topology provided by an embodiment of the present disclosure.

FIG. 4 is a schematic diagram of a storage mapping topology. A storage volume maps a volume to a host 1 (namely, a host) through an FC switch, since four physical links are seen, same appear on the host 1 as four magnetic disk devices (sdfh, sdfw, sdgl and sdo), the four magnetic disk devices have corresponding path information (a path between the host 1 and the switch and a path between the switch and the storage), and the multipath information comes from the path information.

Specifically, a program script for implementing the audit method provided by an embodiment of the present disclosure may be placed into a specific host node in the cloud platform, and the execution permission of the script is given. A timed task is configured for the script. Steps in the script are executed when the timed task is periodically triggered, so that the script is periodically executed. The operation and maintenance personnel check the periodic results at irregular intervals to view whether there is an exception.

Figure 5:
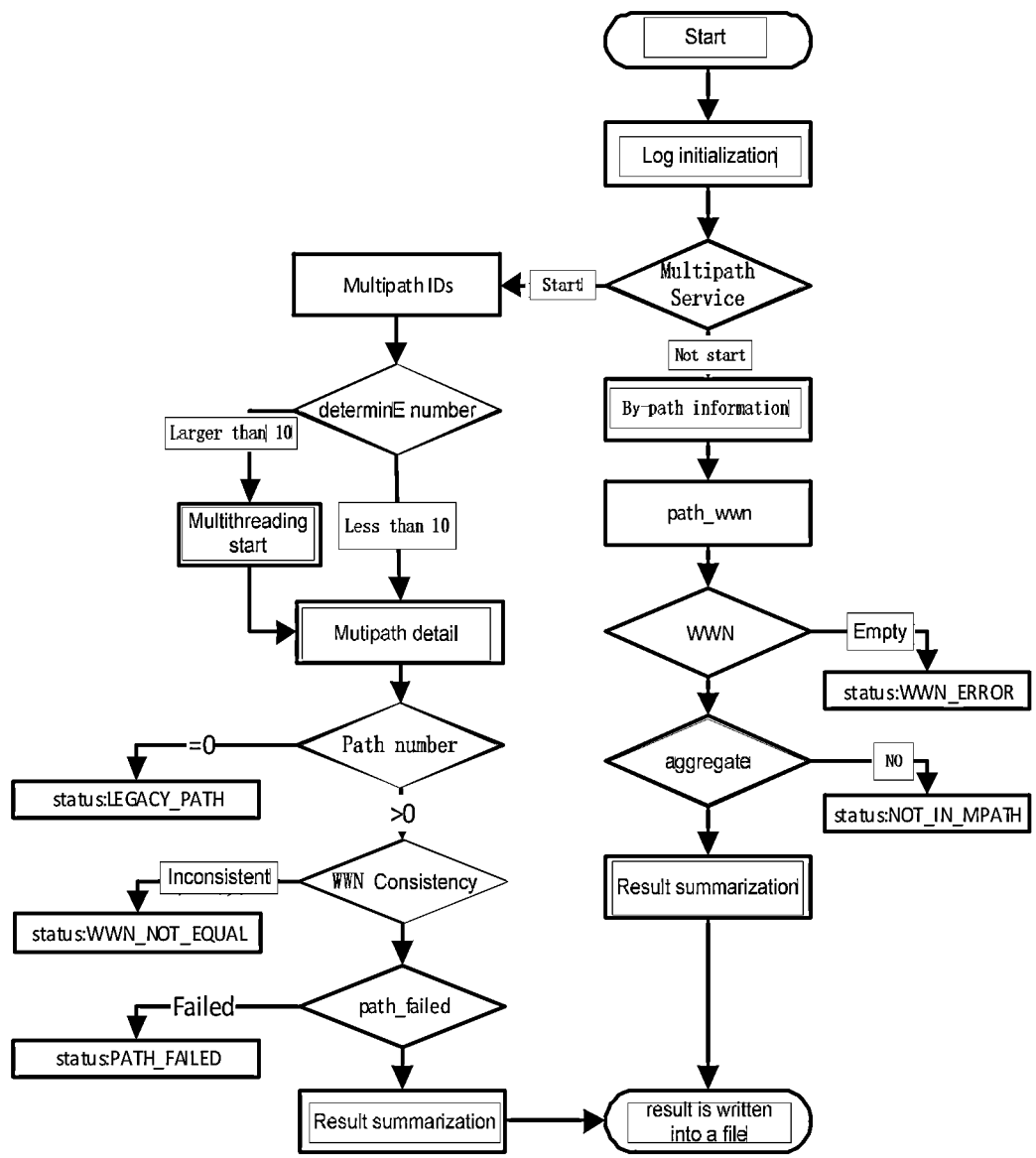
FIG. 5 is a specific flowchart of an audit process provided by an embodiment of the present disclosure.

The audit steps in the single script execution process are as follows, FIG. 5 shows a specific flowchart of an audit process, and the specific steps are as follows.

(1) A log is initialized.

This step is configured to record output printing in the execution process, so as to facilitate information verification.

(2) Whether a multipath service is started is determined, if not, multipath audit is not performed, and if so, subsequent steps are executed.

(3) A multipath-id set is acquired.

(4) Whether the number of multipaths is greater than 10 is determined, if so, multithreading is started; and if not, subsequent steps are executed through single threading.

If the number of the multipaths is too large, multithreading is started to increase the execution speed.

(5) Multipath information (the multipath unique identity, the multipath device size, the sub-path device, the sub-path, the sub-path unique identity and the sub-path lun-id) is parsed to generate object data, and multipath level status (status) is filled according to the multipath object data.

Specifically, the number of sub-paths is 0, and the filling status is LEGACY_PATH (residual path).

The WWN is inconsistent with the sub-path WWN, and the filling status is WWN_NOT_EQUAL.

The path is failed, and the filling status is PATH_FAILED (the path is failed).

(6) Path information details (the device, the unique identity (namely, WWN), the path, and the lun-id) are parsed to generate object data, and path layer status is filled according to the object data.

Specifically, whether the WWN may be acquired normally is determined, and failure in normal acquisition is marked as WWN_ERROR.

Whether the path is aggregated by the multipath is determined, and an unaggregated path is marked as NOT_IN_M-PATH.

Herein, one implementation pseudo code of parsing the information to generate the object data in (5) and (6) is as follows:

```
class mutlipath:
    string wwn;
    string status;
    int size;
    list<path> paths;
class path:
    string wwn;
    string device;
    string path;
``` string lun-id;
int size;
(7) An result is saved to a file.

The file is named by the time to prevent overwriting.

The above implementation mode provided by the embodiment proposes a solution capable of automatically auditing information of the status and difference of each level and summarizing the results in combination with the relevant knowledge about a storage link, magnetic disk path status and multipath magnetic disk device link status of an operating system. The solution may combine an existing automatic timing inspection and notification technology, so as to enable the operation and maintenance personnel to discover the health condition of the magnetic disk in time, handle the faults in advance, and prevent affecting the service and data.

Figure 6:
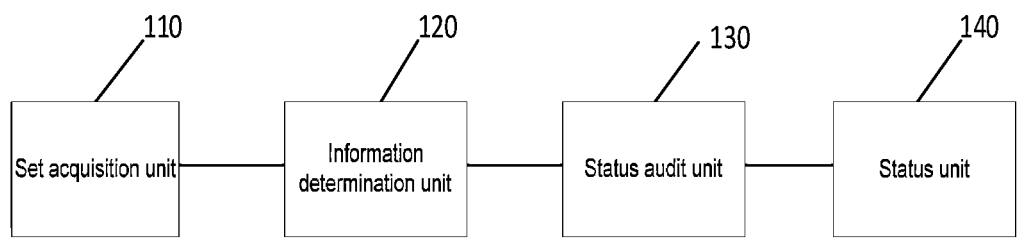
FIG. 6 is a structural block diagram of an apparatus for auditing an abnormality of a block device in a cloud platform provided by an embodiment of the present disclosure.

Referring to FIG. 6, FIG. 6 is a structural block diagram of an apparatus for auditing an abnormality of a block device in a cloud platform provided by an embodiment. The apparatus mainly includes: a set acquisition unit 110, an information determination unit 120, a status audit unit 130, and a status storage unit 140. The apparatus for auditing an abnormality of a block device in a cloud platform provided by the embodiment and the method for auditing an abnormality of a block device in a cloud platform provided by the above embodiment may be referred to each other, which will not be elaborated herein.

The set acquisition unit 110 is mainly configured to acquire a multipath-id set when a multipath module service is executed.

The information determination unit 120 is mainly configured to determine magnetic disk device path information and multipath information of each multipath in the set as to-be-audited device information.

The status audit unit 130 is mainly configured to identify information status of each information item in the to-be-audited device information, and perform to-be-audited status filling according to the information status to obtain audit status.

The status storage unit 140 is mainly configured to store the audit status corresponding to each multipath.

The embodiments provide a computer device, which mainly includes: a memory and a processor.

Herein, the memory is configured to store a program.

The processor is configured to implement the steps of the method for auditing an abnormality of a block device in a cloud platform described by the above embodiment when executing the program, which may specifically refer to the description of the above method for auditing an abnormality of a block device in a cloud platform.

Figure 7:
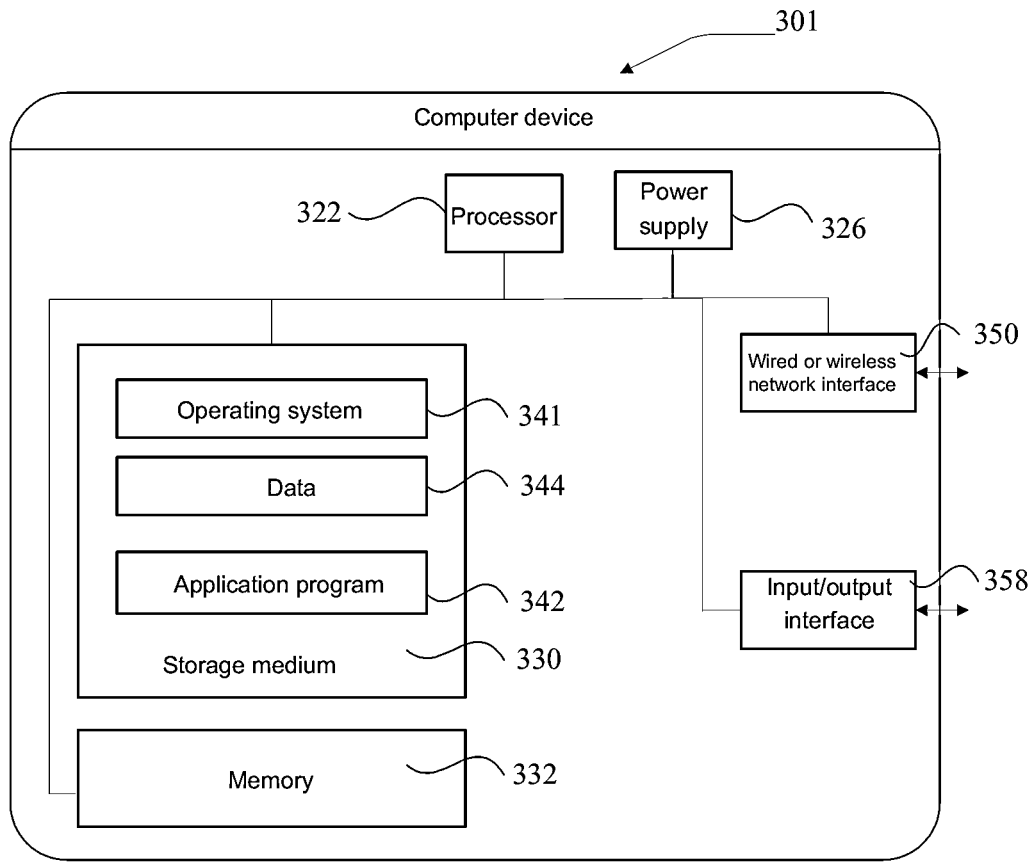
FIG. 7 is a schematic structural diagram of a computer device provided by an embodiment of the present disclosure.

Referring to FIG. 7, which is a schematic structural diagram of a computer device provided by the embodiment, the computer device may vary widely depending on configuration or performance, and may include one or more processors (Central Processing Units (CPU)) 322 (such as one or more processors) and a memory 332, and one or more storage media 330 (such as one or more mass storage devices) that store application programs 342 or data 344. Herein, the memory 332 and the storage medium 330 may be transient storages or persistent storages. A program stored in the storage medium 330 may include one or more modules (not shown), each of which may include a series of instruction operations on a data processing device. Further, the CPU 322 may be configured to communicate with the storage medium 330 to execute a series of instruction operations in the storage medium 330 on the computer device 301.

The computer device 301 may also include one or more power supplies 326, one or more wired or wireless network interfaces 350, one or more input-output interfaces 358, and/or one or more operating systems 341, such as Windows Server™, mac OS X™, Unix™, Linux™, freeBSD™, etc.

The steps in the method for auditing an abnormality of a block device in a cloud platform described in FIG. 1 may be implemented by the structure of the computer device described by the embodiment.

Figure 8:
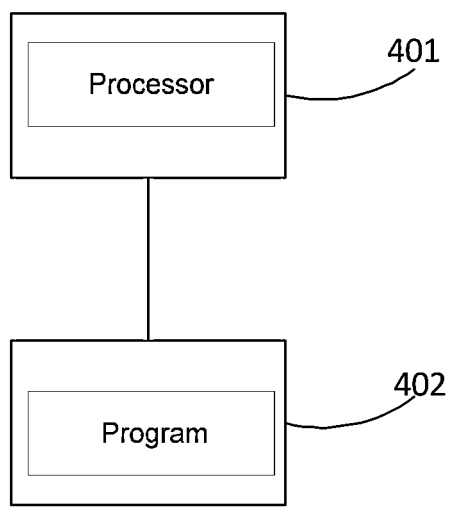
FIG. 8 is a schematic structural diagram of a readable storage medium provided by an embodiment of the present disclosure.

Referring to FIG. 8, which is a readable storage medium disclosed by the embodiment, on which a program 402 is stored, and when executed by a processor 401, the program 402 implements the steps of the method for auditing an abnormality of a block device in a cloud platform as described by the above embodiment, which may specifically refer to the description of the method for auditing an abnormality of a block device in a cloud platform in the above embodiment.

The readable storage medium may specifically be a USB flash disk, a mobile hard disk, a Read-Only Memory (ROM), a Random Access Memory (RAM), a magnetic disk or a compact disc, and other readable storage media which may store program codes.

The various embodiments in the present specification are described in a progressive manner, and each embodiment focuses on differences from other embodiments, and the same similar parts between the various embodiments can be referred to each other. For the apparatus disclosed in the embodiment, since it corresponds to the method disclosed in the embodiment, the description is relatively simple, and the relevant parts can be referred to the method part.

Those skilled in the art may realize that the units and algorithm steps of each example described in combination with the embodiments disclosed in the present disclosure may be implemented by electronic hardware, computer hardware or a combination of computer software and the electronic hardware. In order to clearly illustrate the interchangeability of hardware and software, the composition and steps of each example have been described in general terms of function in the above description. Whether these functions are executed in a hardware or software manner depends on specific applications and design constraints of the technical solutions. Professionals may realize the described functions for each specific application by use of different methods, but such realization shall fall within the scope of the present disclosure.

The steps of the method or algorithm described in combination with the embodiments disclosed herein may be implemented directly by hardware, a software module executed by a processor, or a combination of the two. The software module may be placed in an RAM, a memory, an ROM, an Electrically Programmable Read-Only Memory (EPROM), an Electrically Erasable Programmable Read-Only Memory (EEPROM), a register, a hard disk, a removable disk, a Compact Disc Read-Only Memory (CD-ROM), or any other form of storage medium known in the technical field.

The method and apparatus for auditing an abnormality of a block device in a cloud platform, the device, and the readable storage medium provided by an embodiment of the present disclosure are described in detail above. The principles and implementation modes of the present disclosure are described herein using specific examples, the foregoing description of the embodiments are only used to help the understanding of the method and core concept of the present disclosure. It is to be noted that a number of improvements and modifications may be also made to the present disclosure by those of ordinary skill in the art without departing from the principle of the present disclosure, and all fall within the scope of protection of the claims of the present disclosure.

What is claimed is:

1. A method for auditing an abnormality of a block device in a cloud platform, comprising:
   acquiring a multipath-id set when a host node in the cloud platform executes a multipath module service;
   determining magnetic disk device path information and multipath information of each multipath in the multipath-id set as to-be-audited device information;
   identifying information status of each information item in the to-be-audited device information, and performing to-be-audited status filling according to the information status to obtain audit status; and
   storing the audit status corresponding to each multipath;
   wherein the identifying information status of each information item in the to-be-audited device information, and performing to-be-audited status filling according to the information status to obtain audit status comprises:
   identifying information status of the multipath information in the to-be-audited device information, and performing multipath level status filling according to the information status of the multipath information to obtain multipath level status;
   identifying information status of the magnetic disk device path information in the to-be-audited device information, and performing path level status filling according to the information status of the path information to obtain path level status; and
   using the multipath level status and the path level status as the audit status.

2. The method according to claim 1, wherein the multipath information comprises: a multipath unique identity, multipath device size, a sub-path device, a sub-path, a sub-path unique identity and a sub-path logical unit identity (lun-id);
   the identifying information status of the multipath information in the to-be-audited device information, and performing multipath level status filling according to the information status of the multipath information to obtain multipath level status comprises:
   determining whether the number of the sub-paths is 0, and when the number of the sub-paths is 0, the filling status being LEGACY_PATH;
   determining whether the multipath unique identity is consistent with the sub-path unique identity, and when the multipath unique identity is inconsistent with the sub-path unique identity, the filling status being WWN_NOT_EQUAL; and
   determining whether each sub-path is smooth, and when the each sub-path is not smooth, the filling status being PATH_FAILED.

3. The method according to claim 1, wherein the magnetic disk device path information comprises: a device, a unique identity, a path and a logical unit identity (lun-id); identifying information status of the magnetic disk device path information in the to-be-audited device information, and performing path level status filling according to the information status of the path information to obtain path level status comprises:
   determining whether the unique identity can be normally acquired, and when the unique identity can be normally acquired, marking same as WWN_ERROR; and
   determining whether each path is aggregated by the multipath, and marking the unaggregated path as NOT_IN_MPATH.

4. The method according to claim 3, wherein the determining whether each path is aggregated by the multipath, and marking the unaggregated path as NOT_IN_MPATH comprises:
   determining whether each path is aggregated by the multipath by using a binary search, and marking the unaggregated path as NOT_IN_MPATH.

5. The method according to claim 1, after acquiring the multipath-id set, further comprising:
   determining whether the number of the multipath in the set reaches a single thread processing threshold; and
   when the number of the multipath in the set reaches the single thread processing threshold, splitting the multipath-id set into a plurality of sub-sets;
   then accordingly, the determining magnetic disk device path information and multipath information of each multipath in the set comprises: respectively determining the magnetic disk device path information and the multipath information of each multipath in each subset by using multithreading.

6. The method according to claim 1, wherein the determining magnetic disk device path information and multipath information of each multipath in the set as to-be-audited device information comprises:
   acquiring the magnetic disk device path information and the multipath information of each multipath in the set;
   generating object data according to the acquired information, and obtaining magnetic disk device path object data and multipath object data; and
   using the magnetic disk device path object data and the multipath object data as the to-be-audited device information.

7. A computer device, comprising:
   a memory, configured to store a computer program; and
   a processor, configured to execute the computer program to:
   acquire a multipath-id set when a host node in the cloud platform executes a multipath module service;
   determine magnetic disk device path information and multipath information of each multipath in the multipath-id set as to-be-audited device information;
   identify information status of each information item in the to-be-audited device information, and perform to-be-audited status filling according to the information status to obtain audit status; and
   store the audit status corresponding to each multipath;
   wherein the processor is further configured to execute the computer program to:
   identify information status of the multipath information in the to-be-audited device information, and perform multipath level status filling according to the information status of the multipath information to obtain multipath level status;
   identify information status of the magnetic disk device path information in the to-be-audited device information, and perform path level status filling according to the information status of the path information to obtain path level status; and
   use the multipath level status and the path level status as the audit status.

8. The computer device according to claim 7, wherein the multipath information comprises: a multipath unique identity, multipath device size, a sub-path device, a sub-path, a sub-path unique identity and a sub-path lun-id; the processor is further configured to execute the computer program to:

determine whether the number of the sub-paths is 0, and when the number of the sub-paths is 0, the filling status being LEGACY_PATH;

determine whether the multipath unique identity is consistent with the sub-path unique identity, and when the multipath unique identity is inconsistent with the sub-path unique identity, the filling status being WWN_NOT_EQUAL; and determine whether each sub-path is smooth, and when the each sub-path is not smooth, the filling status being PATH_FAILED.

9. The computer device according to claim 7, wherein the magnetic disk device path information comprises: a device, a unique identity, a path and a logical unit identity (lun-id); the processor is further configured to execute the computer program to:

determine whether the unique identity can be normally acquired, and when the unique identity can be normally acquired, mark same as WWN_ERROR; and determine whether each path is aggregated by the multipath, and mark the unaggregated path as NOT_IN_MPATH.

10. The computer device according to claim 9, the processor is further configured to execute the computer program to:

determine whether each path is aggregated by the multipath by using a binary search, and mark the unaggregated path as NOT_IN_MPATH.

11. The computer device according to claim 7, the processor is further configured to execute the computer program to:

determine whether the number of the multipath in the set reaches a single thread processing threshold; and when the number of the multipath in the set reaches the single thread processing threshold, split the multipath-id set into a plurality of sub-sets;

wherein the processor is further configured to execute the computer program to respectively determine the magnetic disk device path information and the multipath information of each multipath in each subset by using multithreading.

12. The computer device according to claim 7, the processor is further configured to execute the computer program to:

acquire the magnetic disk device path information and the multipath information of each multipath in the set;

generate object data according to the acquired information, and obtain magnetic disk device path object data and multipath object data; and use the magnetic disk device path object data and the multipath object data as the to-be-audited device information.

13. A non-transitory readable storage medium, storing a program, and when the program is executed by a processor, the processor is configured to:

acquire a multipath-id set when a host node in the cloud platform executes a multipath module service;

determine magnetic disk device path information and multipath information of each multipath in the multipath-id set as to-be-audited device information;

identify information status of each information item in the to-be-audited device information, and perform to-be-audited status filling according to the information status to obtain audit status; and store the audit status corresponding to each multipath;

wherein the processor is further configured to:

identify information status of the multipath information in the to-be-audited device information, and perform multipath level status filling according to the information status of the multipath information to obtain multipath level status;

identify information status of the magnetic disk device path information in the to-be-audited device information, and perform path level status filling according to the information status of the path information to obtain path level status; and use the multipath level status and the path level status as the audit status.

14. The non-transitory readable storage medium according to claim 13, wherein the multipath information comprises: a multipath unique identity, multipath device size, a sub-path device, a sub-path, a sub-path unique identity and a sub-path lun-id; the processor is further configured to:

determine whether the number of the sub-paths is 0, and when the number of the sub-paths is 0, the filling status being LEGACY_PATH;

determine whether the multipath unique identity is consistent with the sub-path unique identity, and when the multipath unique identity is inconsistent with the sub-path unique identity, the filling status being WWN_NOT_EQUAL; and determine whether each sub-path is smooth, and when the each sub-path is not smooth, the filling status being PATH_FAILED.

15. The non-transitory readable storage medium according to claim 13, wherein the magnetic disk device path information comprises: a device, a unique identity, a path and a logical unit identity (lun-id); the processor is further configured to:

determine whether the unique identity can be normally acquired, and when the unique identity can be normally acquired, mark same as WWN_ERROR; and determine whether each path is aggregated by the multipath, and mark the unaggregated path as NOT_IN_MPATH.

16. The non-transitory readable storage medium according to claim 15, the processor is further configured to:

determine whether each path is aggregated by the multipath by using a binary search, and mark the unaggregated path as NOT_IN_MPATH.

17. The non-transitory readable storage medium according to claim 13, the processor is further configured to:

determine whether the number of the multipath in the set reaches a single thread processing threshold; and when the number of the multipath in the set reaches the single thread processing threshold, split the multipath-id set into a plurality of sub-sets;

wherein the processor is further configured to execute the computer program to respectively determine the magnetic disk device path information and the multipath information of each multipath in each subset by using multithreading.

* * * * *